(12) United States Patent
Seo et al.

(10) Patent No.: US 10,423,669 B2
(45) Date of Patent: Sep. 24, 2019

(54) MANUFACTURING PROCESS VISUALIZATION APPARATUS AND METHOD

(71) Applicant: HANWHA PRECISION MACHINERY CO., LTD., Gyeongsangam-do (KR)

(72) Inventors: Jeong Yeon Seo, Changwon-si (KR); Cheol Hyung Cho, Changwon-si (KR); Hyun Jin Bang, Changwon-si (KR); Byung Hoon Lee, Changwon-si (KR)

(73) Assignee: HANWHA PRECISION MACHINERY CO., LTD., Changwon-si (KR)

( * ) Notice: Subject to any disclaimer, the term of this patent is extended or adjusted under 35 U.S.C. 154(b) by 289 days.

(21) Appl. No.: 15/265,167

(22) Filed: Sep. 14, 2016

(65) Prior Publication Data
US 2017/0193131 A1 Jul. 6, 2017

(30) Foreign Application Priority Data

Jan. 4, 2016 (KR) ........................ 10-2016-0000343
Jan. 12, 2016 (KR) ........................ 10-2016-0003860

(51) Int. Cl.
*G06F 7/00* (2006.01)
*G06F 17/30* (2006.01)
(Continued)

(52) U.S. Cl.
CPC ....... *G06F 16/904* (2019.01); *G05B 19/4184* (2013.01); *G06T 11/206* (2013.01);
(Continued)

(58) Field of Classification Search
None
See application file for complete search history.

(56) References Cited

U.S. PATENT DOCUMENTS

2003/0023341 A1* 1/2003 Sagawa .............. G05B 19/4093
700/159
2003/0028418 A1* 2/2003 Yamaguchi ............ G06Q 10/06
702/81
(Continued)

FOREIGN PATENT DOCUMENTS

JP      9216144 A    8/1997
JP      4679054 B2   4/2011
(Continued)

*Primary Examiner* — Tuan A Pham
(74) *Attorney, Agent, or Firm* — Sughrue Mion, PLLC

(57) ABSTRACT

A manufacturing process visualization apparatus is provided. The apparatus includes: at least one processor configured to implement: a data receiving unit which receives apparatus data from at least one production apparatus of a manufacturing process line processing a plurality of products; and a matching unit which extracts product record information about each of the products from the received apparatus data, classifies the extracted product record information as information corresponding to specific product flow properties of the manufacturing process line, generates product flow information indicating the specific product flow properties by using the classified product record information, and generates graphic process information about the manufacturing process line in which the product flow information about each product is represented in graphics; and a screen display which displays the generated graphic process pattern information on a screen.

17 Claims, 18 Drawing Sheets

(51) Int. Cl.
*G06F 16/904* (2019.01)
*G06T 11/20* (2006.01)
*G05B 19/418* (2006.01)

(52) U.S. Cl.
CPC .......... *G05B 2219/32403* (2013.01); *G05B 2219/45026* (2013.01); *Y02P 90/14* (2015.11)

(56) References Cited

U.S. PATENT DOCUMENTS

| | | | | |
|---|---|---|---|---|
| 2003/0167238 | A1* | 9/2003 | Zeif | G05B 23/0267 705/400 |
| 2006/0085165 | A1* | 4/2006 | Ushiku | G05B 23/024 702/183 |
| 2010/0050097 | A1* | 2/2010 | McGreevy | G05B 19/409 715/762 |
| 2014/0200858 | A1* | 7/2014 | Chatow | G06F 17/50 703/1 |
| 2015/0081373 | A1* | 3/2015 | Kobayashi | G06Q 10/00 705/7.23 |
| 2015/0097840 | A1* | 4/2015 | Nishimura | G06T 11/206 345/443 |
| 2015/0149131 | A1* | 5/2015 | Kuboi | G06F 17/5009 703/2 |
| 2016/0188770 | A1* | 6/2016 | Montana | G06F 17/5009 700/97 |

FOREIGN PATENT DOCUMENTS

| | | | |
|---|---|---|---|
| JP | 5613919 | B2 | 10/2014 |
| KR | 1020070104073 | A | 10/2007 |
| KR | 1020090041714 | A | 4/2009 |

* cited by examiner

FIG. 5

| Production data | 1 | 2 | 3 | 4 | 5 | 6 | 7 | 8 | |
|---|---|---|---|---|---|---|---|---|---|
| PCB #1 | ◇ | ◇ | ◇ | ◇ | ◇ | ◇ | ◇ | ◇ | PCB #1 |
| PCB #2 | ◇ | ◇ | ◇ | ◇ | ◇ | ◇ | X | X | Defective products have been removed by MA |
| PCB #3 | ◇ | ◇ | ◇ | ◇ | ◇ | ◇ | ◇ | ◇ | PCB #3 |
| PCB #4 | ◇ | ◇ | X | X | X | X | X | X | Defective products have been removed by PA |
| PCB #5 | ◇ | ◇ | ◇ | ◇ | ◇ | ◇ | ◇ | ◇ | PCB #5 |
| | 5sheets | 5sheets | 4sheets | 4sheets | 4sheets | 4sheets | 3sheets | 3sheets | |

FIG. 7C
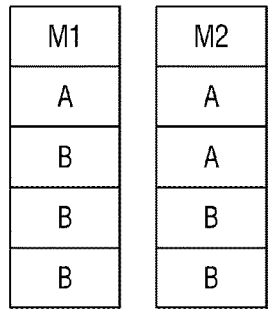
FIG. 7D
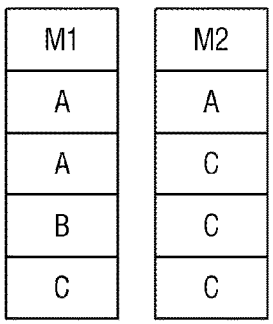
FIG. 8
| 1 | 2 | 3 | 4 |
| No | Output Time | | | | PCB No |
|---|---|---|---|---|---|
| 1 | 12:48:15 | 12:50:19 | 12:51:15 | 12:51:49 | P1 |
| 2 | 12:49:15 | 12:51:20 | 12:52:15 | 12:52:49 | P2 |
| 3 | 12:50:16 | 12:54:25 | 12:53:16 | 12:53:49 | |
| 4 | 12:51:16 | 12:55:31 | 12:54:16 | 12:54:49 | |
| 5 | 12:52:17 | 12:56:32 | 12:55:22 | 12:55:55 | P3 |

FIG. 9

| 1 | 2 | 3 | 4 |

| No | Output Time | | | | PCB No |
|---|---|---|---|---|---|
| 1 | 12:33:30 | 12:32:59 | 12:46:14 | 12:49:15 | P1 |
| 2 | 12:34:35 | 12:34:00 | 12:47:15 | 12:50:16 | P2 |
| 3 | 12:35:35 | 12:36:00 | 12:48:20 | 12:51:16 | P3 |
| 4 | 12:36:15 | 12:36:40 | 12:49:20 | 12:52:17 | P4 |
| 5 | 12:37:05 | 12:37:35 | 12:50:20 | 12:53:23 | |

MANUFACTURING PROCESS VISUALIZATION APPARATUS AND METHOD

CROSS-REFERENCE TO THE RELATED APPLICATIONS

This application is based on and claims priority from Korean Patent Application Nos. 10-2016-0000343 and 10-2016-0003860 filed on Jan. 4, 2016 and Jan. 12, 2016, respectively, in the Korean Intellectual Property Office, the disclosures of which are incorporated herein in their entirety by reference.

BACKGROUND

1. Technical Field

Apparatuses and methods consistent with the exemplary embodiments of the inventive concept relate to manufacturing process visualization, and more particularly, to manufacturing process visualization enabling users to easily understand a current status of a manufacturing process.

2. Description of the Related Art

To understand the flow of a manufacturing process, various pieces of information including information regarding an operational status such as an apparatus operation rate, stoppage and failure, production information and a digitalized line of balancing (LOB) need to be combined and interpreted.

However, such an interpretation requires a worker having broad experience in a manufacturing process field or know-how of analysis.

Therefore, there have been attempts to present a manufacturing process in visual forms. A Gantt chart has been typically used to graphically illustrate a product plan and a result so as to conduct process management. Recently, as an advanced form of the Gantt chart, a display device may display thereon the Gantt chart.

The Gantt chart is a graphical representation using two elements of a target and a time. The Gantt chart has been frequently used in a process management in a production process for manufacturing products through the use of production apparatuses. This is because the Gantt chart has merits of simplicity and clarity enabling both a plan and a result to be simultaneously recorded and shown on a chart.

However, the Gantt chart has limitations in expressing changes in manufacturing processes, and thus may not precisely show a process status. In addition, the Gantt chart may not clearly illustrate an organic relationship between tasks, making it difficult to understand a relationship between the information on a plurality of printed circuit board (PCB) substrates being produced and corresponding apparatus in a process of an inline production system such as a surface mount technology (SMT) process.

Furthermore, there exists a need for a system that allows even novice users to intuitively understand a current status of a manufacturing process without needing to derive the current status of the manufacturing process through an interpretation of complicated numerical values, and provides information on the status of the manufacturing process being visually displayed with minimized error, thus enabling active and prompt countermeasures to various situations such as process failures rather than roughly identifying the process status.

SUMMARY

Exemplary embodiments are provided to address the problems set forth above. The exemplary embodiment provides a manufacturing process visualization apparatus and method that allow even novice users to intuitively understand a status of a manufacturing process without needing to derive the status of the manufacturing process through an interpretation of complicated numerical values, and provide information on the status of the manufacturing process being visually displayed with minimized error, thus enabling active and prompt countermeasures to various situations such as process failures rather than roughly identifying the process status.

However, the exemplary embodiments are not restricted to those set forth herein. The other embodiments which are not mentioned herein will become more apparent to a person skilled in the art to which the inventive concept pertains by referencing the detailed description given below.

According to an aspect of an exemplary embodiment, there is provided a manufacturing process visualization apparatus which may include: at least one processor configured to implement a data receiving unit which receives apparatus data from a plurality of production apparatuses of a manufacturing process line processing a plurality of products; and a matching unit which extracts product record information about each of the products from the received apparatus data, classifies the extracted product record information as information corresponding to specific product flow properties of the manufacturing process line, generates product flow information indicating the specific product flow properties by using the classified product record information, and generates graphic process information about the manufacturing process line in which the product flow information about each product is represented in graphics; and a screen display which displays the generated graphic process pattern information on a screen.

The product record information may include an introduction time of a product introduced in a production apparatus among the production apparatuses, a discharge time of the product discharged from the production apparatus, and model type information of the product.

The matching unit may determine, as classification criteria parameters in classifying the extracted product record information as the information corresponding to the specific product flow properties, at least one among information about the introduction time and/or the discharge time, an inter-production apparatus flow time, an inter-production apparatus time difference information, whether the time difference information is a negative number, whether the time difference information falls within an error range which is preset with respect to an average of the time difference information, information obtained by comparing a number of product flow lines based on the product flow information and a number of total production apparatuses, whether a product model type applied to the manufacturing process line is changed, and whether the extracted product record information is final data.

The matching unit may further include whether to bypass a production apparatus, as a candidate of the classification criteria parameters in classifying the extracted product record information as the information corresponding to the specific product flow properties.

The matching unit may determine product model types of the products processed at each of the production apparatuses, classify a production apparatus as a standard apparatus or a bypass apparatus according to a number of product model types processed at the production apparatus, and determine a product model type of which processing is to be bypassed at the bypass apparatus.

The matching unit may generate the graphic process information in a format that can be output on a process visualization screen including an axis along which pieces of information specifying at least one of the production apparatuses of the manufacturing process line are sequentially arranged and a time axis indicating a time for the processing.

The screen display unit may display a flow line chart in which flow information about the products is shown in a graph, and a process production information box comprising data reliability, the reliability indicating, as a result of collection of product flow information about the production apparatuses, a ratio between a maximum number of products that can be processed and a number of products for which the product flow information are matched from introduction into the manufacturing process line to discharge from the manufacturing process line.

The screen display unit may further display a chart option box for selectively displaying a time when at least one of the plurality of production apparatuses has stopped, a time when an interlock has occurred, and a time when a defect has occurred to a certain product.

When the time when the at least one of the plurality of production apparatuses has stopped is selected in the chart option box, a date, time or a reason for the stoppage may be displayed in the flow line chart.

When the time when a defect has occurred to a certain product flowing in the plurality of production apparatuses is selected in the chart option box, a date, time or a reason for the occurrence of the defect in the flow line chart, and an image of the defective product may be displayed together.

When the image of the defective product is selected, the image may be enlarged and displayed in the screen display.

When a worker who is in charge of the plurality of production apparatuses is selected in the chart option box, a worker who is in charge of the manufacturing process line at a certain date and a certain time may be displayed.

The screen display may further display a detailed chart view box capable of enlarging the flow line chart.

When all data is selected to be displayed in the detailed chart view box, the product flow information regarding products which have been introduced into the manufacturing process line but have not been discharged are displayed in a graph in the flow line chart.

The screen display may further display a production quantity button for representing, in a graph, a production quantity for each of the production apparatuses of the manufacturing process line and for each model type of the products being processed.

According to an aspect of an exemplary embodiment, there is provided a manufacturing process visualization method which may include: receiving apparatus data from a plurality of production apparatuses of a manufacturing process line processing a plurality of products; extracting product record information about each of the products from the received apparatus data; classifying the extracted product record information as information corresponding to specific product flow properties of the manufacturing process line; generating product flow information indicating the specific product flow properties by using the classified product record information; generating graphic process information about the manufacturing process line in which the product flow information for each product is represented in graphics; and displaying the generated graphic process pattern information on a screen.

The product record information may include an introduction time of a product introduced in a production apparatus among the production apparatuses, a discharge time of the product discharged from the production apparatus, and model type information of the product.

The classifying may include determining, as classification criteria parameters in classifying the extracted product record information as the information corresponding to the specific product flow properties, at least one among information about the introduction time and/or the discharge time, an inter-production apparatus flow time, an inter-production apparatus time difference information, whether the time difference information is a negative number, whether the time difference information falls within an error range which is preset with respect to an average of the time difference information, information obtained by comparing a number of product flow lines based on the product flow information and a number of total production apparatuses, whether a product model type applied to the manufacturing process line is changed, and whether the extracted product record information is final data.

The classifying may further include enabling whether to bypass a production apparatus to be included as a candidate of the classification criteria parameters in classifying the extracted product record information as the information corresponding to the specific product flow properties.

The exemplary embodiments have advantages of allowing even novice users to intuitively understand a status of a manufacturing process without needing to derive the status of the manufacturing process through an interpretation of complicated numerical values, and provides information on the status of the manufacturing process being visually displayed with minimized error, thus enabling active and prompt countermeasure to various situations such as process failures rather than roughly identifying the process status.

However, effects are not restricted to the exemplary embodiments set forth herein and more diverse effects are included in this description.

BRIEF DESCRIPTION OF THE DRAWINGS

FIG. 5 illustrates an exemplary embodiment of a manufacturing status of production apparatuses arranged in a manufacturing process line;

FIGS. 7A-7D illustrate exemplary embodiments of a matching rule executed by the matching unit of FIG. 1;

FIG. 8 illustrates an exemplary embodiment of another matching rule executed by the matching unit of FIG. 1;

FIG. 9 illustrates an exemplary embodiment of still another matching rule executed by the matching unit of FIG. 1;

DETAILED DESCRIPTION OF THE EXEMPLARY EMBODIMENTS

Figure 1:
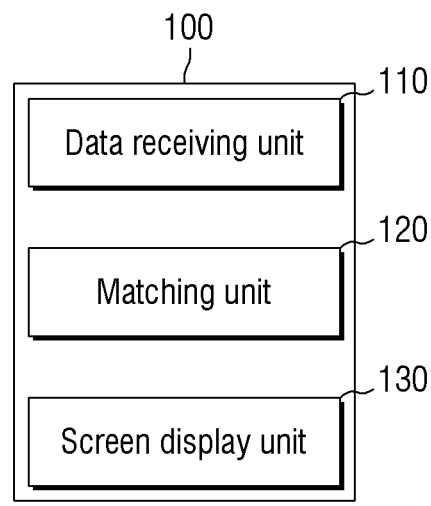
FIG. 1 is a block diagram illustrating a manufacturing process visualization apparatus, according to an exemplary embodiment.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the exemplary embodiments set forth herein. Rather, these embodiments are provided so that this disclosure will be thorough and complete and will fully convey the inventive concept to those skilled in the art, and the inventive concept will only be defined by the appended claims. Like reference numerals refer to like elements throughout the specification.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The exemplary embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The exemplary embodiments will hereinafter be described with reference to the attached drawings.

FIG. 1 is a block diagram illustrating a manufacturing process visualization apparatus according to an exemplary embodiment.

A manufacturing process visualization apparatus 100 allows even novice users to intuitively understand a current status of a manufacturing process without needing to derive the current status of the manufacturing process through an interpretation of complicated numerical values, and provides information on the status of the manufacturing process being visually displayed with minimized error, thus enabling active and prompt countermeasures to various situations such as process failures rather than roughly identifying the process status.

That is, the manufacturing process visualization apparatus 100 may display a production status for each product being produced, by using one or more production apparatuses arranged in a manufacturing process line with respect to a time sequence, and allow production information including information on a status of a process operation at an apparatus, time, production model, worker, warning, and apparatus stop and the like to be intuitively understood in a single output screen by a user such as a worker.

Furthermore, the manufacturing process visualization apparatus 100 collects multiple pieces of information relating to the production status to autonomously generate analysis or result information, and then displays finally derived information in intuitively understandable graphic information on the output screen, thus enabling users to understand the production status of the manufacturing process line on a real time basis without needing to analyze information.

This means that the manufacturing process visualization apparatus 100 may support not only a person in charge of production who can easily understand the production status but also management board of directors or supporting department staffs who may not know thoroughly about a status and environment of the manufacturing process line so that the person in charge of production and the management board of directors or supporting department staffs can easily analyze various pieces of information regarding the production status of the manufacturing process line in various points of views and easily extract necessary information for each person.

To create the output screen on which the process of the manufacturing process line is visualized, a time when a same product is introduced into or discharged from each apparatus on the manufacturing process line needs to be connected. However, the relevant products often need not to be identified during a process of moving along the manufacturing process line depending on the characteristics of shapes of the products moving along the manufacturing process line or status of production field.

Marking identification information in each product during a production process may cause problems of degraded production efficiency or increased production cost.

To avoid the problems, the manufacturing process visualization apparatus 100 may have features of identifying each product without giving identification information to the product moving along a manufacturing process line.

Specifically, the manufacturing process visualization apparatus 100 may include a data receiving unit 110 which receives apparatus data from at least one production apparatus in a manufacturing process line, a matching unit 120 which extracts product record information about each product from the received apparatus data, classifies the extracted product record information as information corresponding to specific product flow properties of the manufacturing process line, generates product flow information indicating the specific product flow properties by using a result of the collection of the classified product record information, and generates graphic process information about the manufacturing process line in which the product flow information about each product is represented in graphics, and a screen display 130 which displays the generated graphic process information on a screen.

Figure 2:
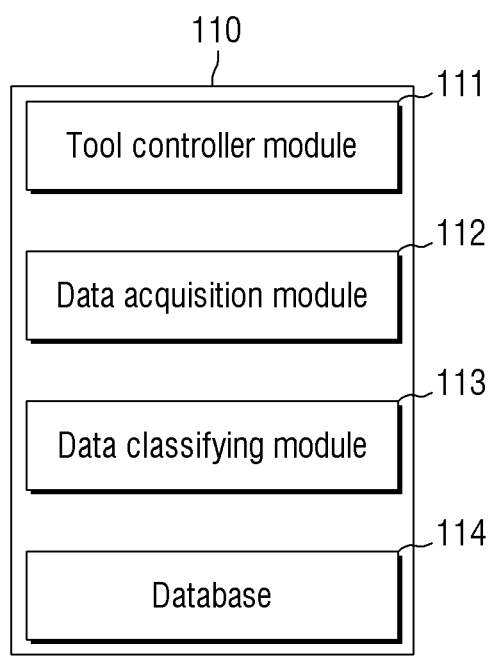
FIG. 2 is a detailed block diagram specifically illustrating a data receiving unit of FIG. 1, according to an exemplary embodiment.

FIG. 2 is a detailed block diagram specifically illustrating the data receiving unit 110 of FIG. 1.

As shown in FIG. 2, the data receiving unit 110 may include a tool controller module 111, a data acquisition module 112, a data classifying module 113, and a database 114.

The tool controller module 111 may receive apparatus data from each production apparatus arranged in a manufacturing process line, and preferably but not necessarily, the tool controller module 111 may be arranged to correspond to each production apparatus.

The data acquisition module 112 may serve to process apparatus data provided from production apparatuses of different brands into standardized data since each production apparatus arranged in the manufacturing process line may have a same brand or different brands according to circumstances.

The data classifying module 113 may collect data standardized and provided from the data acquisition module 112, and preliminarily classify the collected data. For example, the data classifying module 113 may classify the data provided from the data acquisition module 112 into uninterpretable data including errors and data available in a production status analysis by applying preset preliminary classification criteria.

The uninterpretable data including errors may be those which fail to conform to the aforementioned standardized data format, or those which are at least partially corrupted during a data transmission process and thus become unreadable.

The data classified as being available in a production status analysis by the data classifying module 113 may be stored in the database 114.

Figure 3:
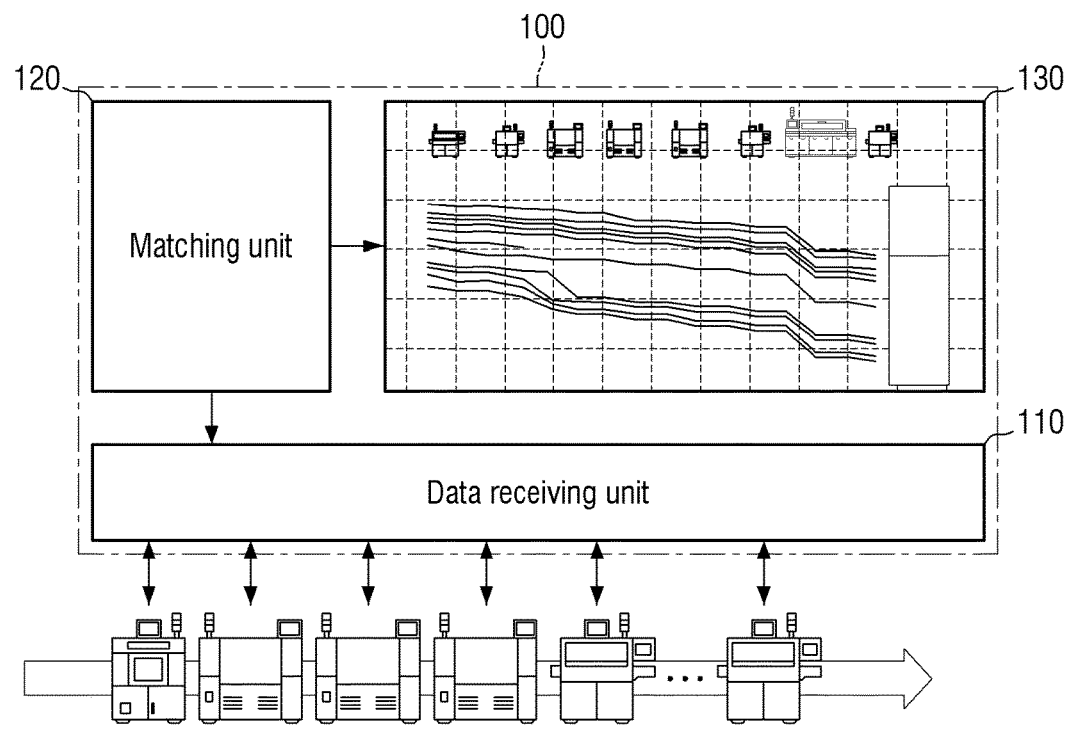
FIG. 3 illustrates an exemplary embodiment of a configuration of the manufacturing process visualization apparatus of FIG. 1.

FIG. 3 illustrates an exemplary embodiment of a configuration of the manufacturing process visualization apparatus 100 of FIG. 1.

As shown in FIG. 3, the matching unit 120 may generate graphic process information about the manufacturing process line on the basis of the apparatus data provided from the data receiving unit 110, and provide the generated graphic process information to the screen display 130 for display on an output screen.

In the manufacturing process line, products may undergo a production process in which the products flow along a line to pass through each production apparatus arranged in the line.

At this time, the matching unit 120 may serve to match products which are the same or predicted as being the same one another among a plurality of products passing through each production apparatus.

The apparatus data provided from the production apparatuses may include information regarding a plurality of products introduced into and discharged from the production apparatuses. For example, the apparatus data may include first product record information regarding a first product introduced into and discharged from the production apparatuses, second product record information regarding a second product introduced into and discharged from the production apparatuses, and Nth product record information regarding an Nth product introduced into and discharged from the production apparatuses.

The manufacturing process visualization apparatus 100 may not only check visual information regarding the products introduced into and discharged from the production apparatuses but also classify model types of the products.

Thus, the product record information may include an introduced time of a product being introduced into the production apparatus, a discharge time of the product being discharged from the production apparatus, and product model information.

The matching unit 120 may extract the above-described product record information from the apparatus data provided from the production apparatus, and classify the extracted product record information as information corresponding to specific product flow properties of the manufacturing process line.

Even products of a same model type may be discriminated during the passage through the manufacturing process line, and the products that can be thus discriminated may sequentially pass through at least one production apparatus arranged in the manufacturing process line. The specific product flow properties of the manufacturing process line as used herein may mean line flow history properties of products which have passed through the manufacturing process line, the line flow history properties accumulatively reflecting thereto, during the passage through the manufacturing process line, the time during which the products being flowed stays at each production apparatus and the time consumed by the products in moving among production apparatuses.

That is, the matching unit 120 may be pre-store information regarding specific product flow properties of the manufacturing process line, or may classify product record information on the basis of the result of an arithmetic operation of the information, and may generate product flow information indicating the specific product flow properties by using the result of a collection of the product record information.

The specific product flow properties may be information regarding an ideal product flow, for example, in a case where a product has passed through the line causing no abnormality in the production field while the aforementioned product flow information may be the data generated while an actual product passes through each production apparatus of the production process line rather than an ideal data format.

Figure 4:
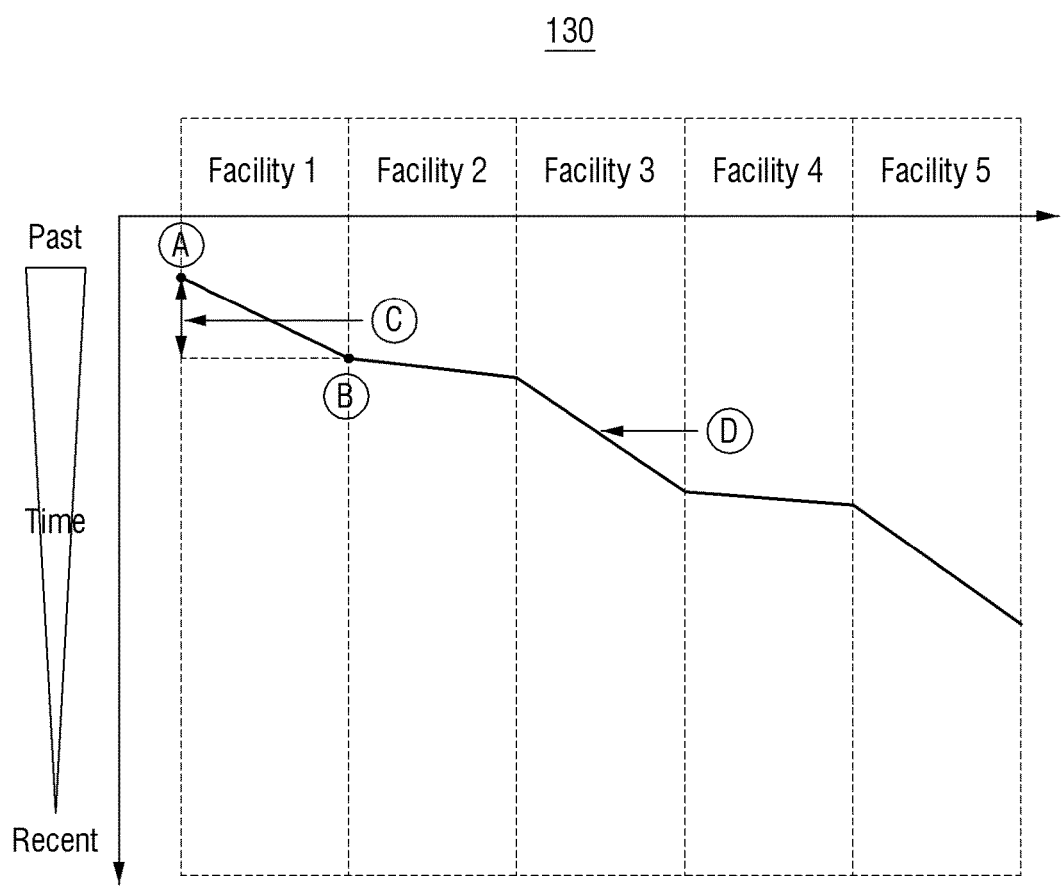
FIG. 4 illustrates an exemplary embodiment of a configuration of a screen output by a screen display of FIG. 1.

FIG. 4 illustrates an exemplary embodiment of a configuration of a screen output by the screen display 130 of FIG. 1.

As shown in FIG. 4, the screen display 130 displays a flow line chart. The flow line chart shows information regarding product flow properties of a manufacturing process line as described above, enabling users to understand a production status at the manufacturing process line on a real time basis through the flow line chart without needing to analyze information.

As shown in FIG. 4, the flow line chart may include an axis along which pieces of information specifying at least one production apparatus of the manufacturing process line are sequentially arranged, and a time axis indicating a time during which the process is performed. The matching unit 120 may process information regarding product flow properties into a format which can be output on the screen display 130 to create the flow line chart. The screen display 130 may receive, from the matching unit 120, the flow line chart in a format which can be output, and display the received flow chart line on a screen.

The screen display 130 may display product flow information through the method described above. The screen display 130 may display on the output screen thereof time A when a product is introduced into a first production apparatus, time B when the product is discharged from the first production apparatus, and time C during which the product stays in the first production apparatus, the time C being a difference between the time A and the time B.

Furthermore, the slope of the graph for each apparatus can be read to check line balance D in the manufacturing process line having the apparatuses.

Figure 6:
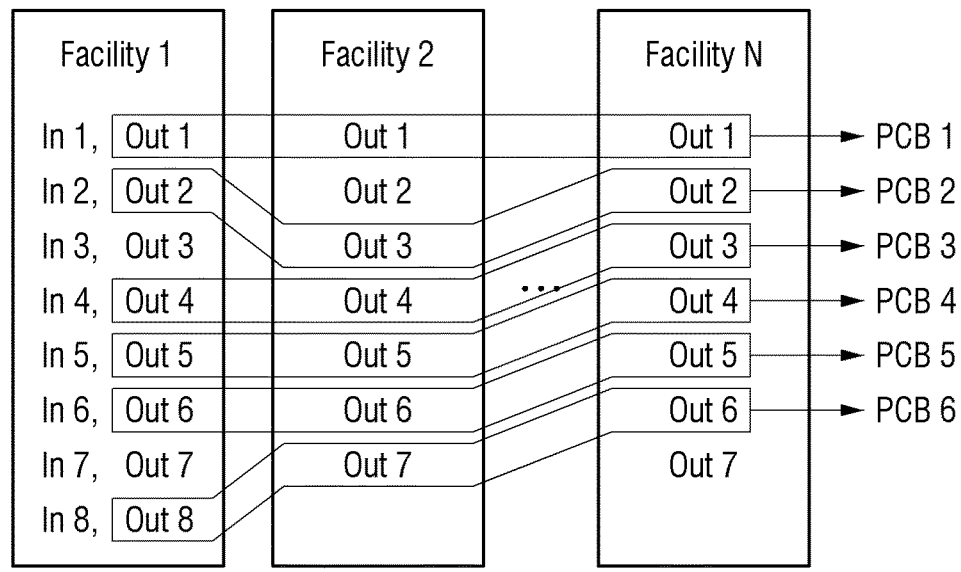
FIG. 6 illustrates an exemplary embodiment of products matched by a matching unit of FIG. 1.

FIG. 5 illustrates an exemplary embodiment of a manufacturing status of production apparatuses arranged in a manufacturing line, FIG. 6 illustrates an exemplary embodiment of products matched by the matching unit 120 of FIG. 1, FIGS. 7A-7D illustrate exemplary embodiments of a matching rule executed by the matching unit 120 of FIG. 1, FIG. 8 illustrates an exemplary embodiment of another matching rule executed by the matching unit 120 of FIG. 1, and FIG. 9 illustrates an exemplary embodiment of still another matching rule executed by the matching unit 120 of FIG. 1. At least FIGS. 5 and 6 may be implemented as a screen output at the screen display 130 of FIG. 1.

As shown in FIG. 5, the numbers of products produced in each production apparatus may differ since the products are removed after being determined as defective or for various other reasons.

Thus, the matching unit 120 may have limitations in connecting a product introduced time and a product discharge time in a time-series manner on the basis of the apparatus data provided from each production apparatus to track and visually display flow of a same product.

Therefore, the matching unit 120 may have features of tracking, with minimized errors, the flow of the same product on a manufacturing process line.

The matching unit 120 may determine, as classification criteria parameters in classifying the extracted product record information as information corresponding to the specific product flow properties, at least one among information about an introduced time and/or a discharge time, an inter-production apparatus flow time, an inter-production apparatus time difference information, whether the time difference information is a negative number, whether the time difference information falls within an error range which is preset with respect to an average of the time difference information, information obtained by comparing the number of product flow lines based on the product flow information and the number of total production apparatuses, whether a product model type applied to the manufacturing process line is changed, and whether the extracted product record information is final data.

Furthermore, the matching unit 120 may further include whether to bypass a production apparatus, as a candidate of the classification criteria parameters in classifying the extracted product record information as information corresponding to the specific product flow properties.

Thus, the matching unit 120 may perform a process in which logics described below are combined.

Connect product record information on the basis of information provided from each production apparatus If a time difference between production apparatuses is a negative number, connect product record information to a next product record information If the time difference exceeds an error range which is preset with respect to an average of time difference information, skip the time difference Skip the data finally left in matching The number of product flow lines is smaller than or equal to the total number of production apparatuses When a product model type produced in a manufacturing process line is changed, skip unprocessed data Connect a time of a bypassed apparatus to a time of a time-serially immediately previous apparatus (that is, a cycle time is determined as zero)

The matching unit 120 may combine the above-described logics to classify a same product or a product predicted as being the same.

When information regarding a bypassed model type and apparatus is not provided from a production apparatus, the matching unit 120 may perform a process in which logics described below are combined.

Collect model names of products processed in each production apparatus

Determine a production apparatus having processed the relatively largest number of product model types as a standard apparatus Determine a production apparatus having processed less product model types than the standard apparatus as a bypass apparatus Compare the standard apparatus and the bypass apparatuses apparatus to specify a bypass product model type Determine whether to bypass a production apparatus and a bypass product model type for each production apparatus, and then connect a time of the bypassed apparatus to a time of the time-serially immediately previous apparatus (that is, a cycle time is determined as zero)

Referring to FIGS. 7A-7D, the matching unit 120 may track a product for each product model type.

Figure 7A:
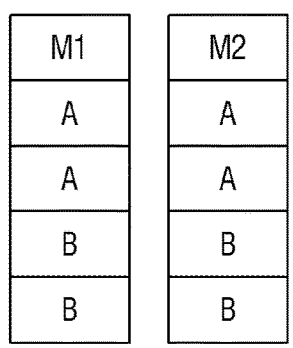

For example, as shown in FIG. 7A, when products of a same model type are ideally matched with no product loss between apparatus M1 and apparatus M2, product flow lines are connected in a time-series manner.

Figure 7B:
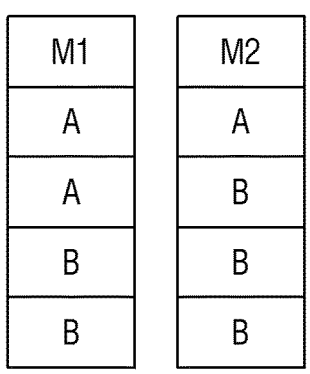

Meanwhile, as shown in FIG. 7B, product record information indicates that a first product of model A, a second product of model A, a third product of model B, and a fourth product of model B are sequentially introduced and discharged at apparatus M1, while a first product of model A, a second product of model B, a third product of model B, and a fourth product of model B are sequentially introduced and discharged at apparatus M2. In this case, since the second product of model A at apparatus M1 has no counterpart product record information at apparatus M2, the second product of model A at apparatus M1 can be treated as being lost or removed due to defects. Furthermore, the first product of model B at apparatus M1 can be matched to the first product of model B at apparatus M2, and the second product of model B at apparatus M1 can be matched to the second product of model B at apparatus M2. The third product of model B at apparatus M2 has no related product record information at apparatus M1 in terms of only a matching relationship between apparatuses M1 and M2, and thus the third product of model B at apparatus M2 can be treated as being lost or removed due to defects.

As shown in FIG. 7C, product record information indicates that a first product of model A, a second product of model B, a third product of model B, and a fourth product of model B are sequentially introduced and discharged at apparatus M1, while a first product of model A, a second product of model A, a third product of model B, and a fourth product of model B are sequentially introduced and discharged at apparatus M2. In this case, since the fourth product of model B at apparatus M1 has no counterpart product record information at apparatus M2, the fourth product of model B at apparatus M1 can be treated as being lost or removed due to defects. Furthermore, the second product of model B at apparatus M1 can be matched to the third product of model B at apparatus M2, and the third product of model B at apparatus M1 can be matched to the fourth product of model B at apparatus M2. The second product of model A at apparatus M2 has no related product record information in apparatus M1 in terms of only a matching relationship between apparatuses M1 and M2, and thus the second product of model A at apparatus M2 can be treated as being lost or removed due to defects.

As shown in FIG. 7D, product record information indicates that a first product of model A, a second product of model A, a third product of model B, and a fourth product of model C are sequentially introduced and discharged at apparatus M1, while a first product of model A, a second product of model C, a third product of model C, and a fourth product of model C are sequentially introduced and discharged at apparatus M2. In this case, since the second product of model A and the third product of model B at apparatus M1 has no counterpart product record information at apparatus M2, the second product of model A and the third product of model B at apparatus M1 can be treated as being lost or removed due to defects. In addition, the fourth product of model C at apparatus M1 can be matched to the second product of model C at apparatus M2. The third product of model C and the fourth product of model C at apparatus M2 has no related product record information at apparatus M1 in terms of only a matching relationship between apparatuses M1 and M2, and thus the third product of model C and the fourth product of model C at apparatus M2 can be treated as being lost or removed due to defects.

Referring to FIG. 8 and FIG. 9, No. 2 data of the first production apparatus can be matched to No. 3 data of the second production apparatus in chronological order, but the time difference between the first production apparatus and the second production apparatus exceeds an error range (1 minute and 30 seconds) preset with respect to an average which is 30 seconds, and thus No. 3 data of the first production apparatus can be determined as a matching candidate.

That is, as shown in FIG. 8, No. 3 data of the second production apparatus can be matched to No. 3 data of the third production apparatus in the order of product output of the production apparatuses, but the third production apparatus is in an earlier time than the second production apparatus. This means that the time difference between the two apparatuses is a negative number. Furthermore, the time difference between No. 3 data of the second production apparatus and No. 4 data of the third production apparatus is also a negative number. Thus, No. 5 data of the third production apparatus can be determined as a next matching candidate of No. 3 data of the second production apparatus.

As shown in FIG. 9, No. 2 data of the second production apparatus can be matched to No. 3 data of the second production apparatus in chronological order, but the time difference between the first production apparatus and the second production apparatus exceeds an error range (1 minute and 30 seconds) preset with respect to an average which is 30 seconds, and thus No. 3 data of the first production apparatus can be determined as a matching candidate. The error range is preset by a user, and thus can be changed according to a production apparatus.

Figure 10:
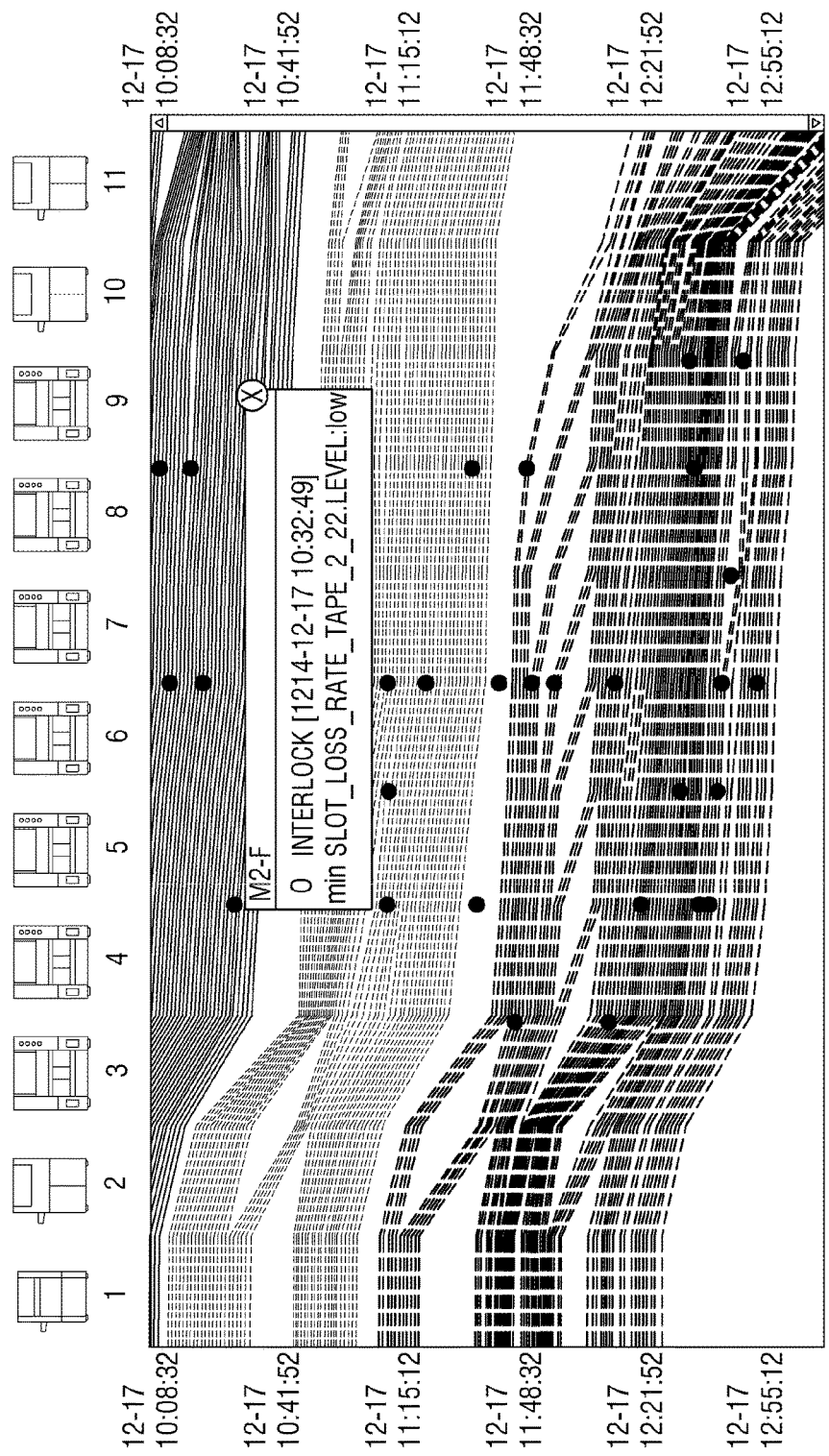
FIG. 10 illustrates an exemplary embodiment of an output screen configuration.
Figure 11:
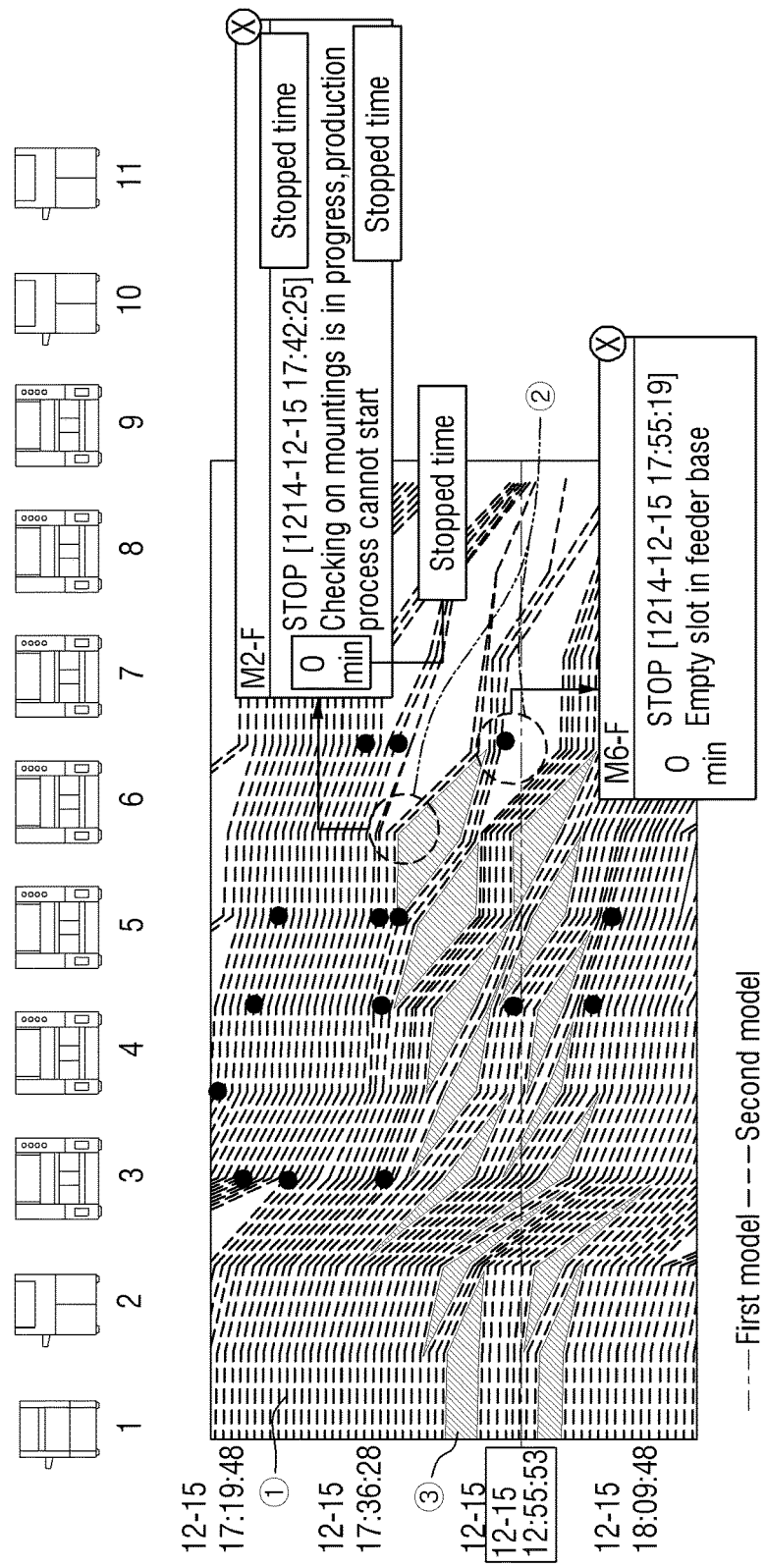
FIG. 11 illustrates another exemplary embodiment of an output screen configuration.

FIG. 10 illustrates an exemplary embodiment of an output screen configuration, and FIG. 11 illustrates another exemplary embodiment of an output screen configuration.

As shown in FIG. 10 and FIG. 11, the matching unit 120 may generate graphic process information in a format that can be output on a process visualization screen including an axis along which pieces of information specifying at least one production apparatus of a manufacturing process line are sequentially arranged and a time axis indicating the time during which a process is performed.

The screen display 130 may receive, from the matching unit 120, the graphic process information in a format that can be output on a process visualization screen, and output the received graphic process information on the screen.

Referring to FIG. 11, the graphic process information may include first graphic information ① indicating a product production pattern, second graphic information ② indicating a point at which a trouble in product production occurs, and third graphic information ③ indicating a period during which a product production stops.

The first graphic information ① may support intuitive understanding on a line of balancing (LOB), and allows for easy understanding on a production pattern of a manufacturing process line.

The second graphic information ② may include information on a reason of the trouble in the product production and information on details of the trouble in the product production.

To this end, the matching unit 120 may extract apparatus operation information from apparatus data of a production apparatus corresponding to the point in the second graphic information ②, and generate information on the reason through the extracted apparatus operation information.

Furthermore, the matching unit 120 may generate the information on the reason on the basis of an interpretation of the information on the process visualization screen.

Figure 12:
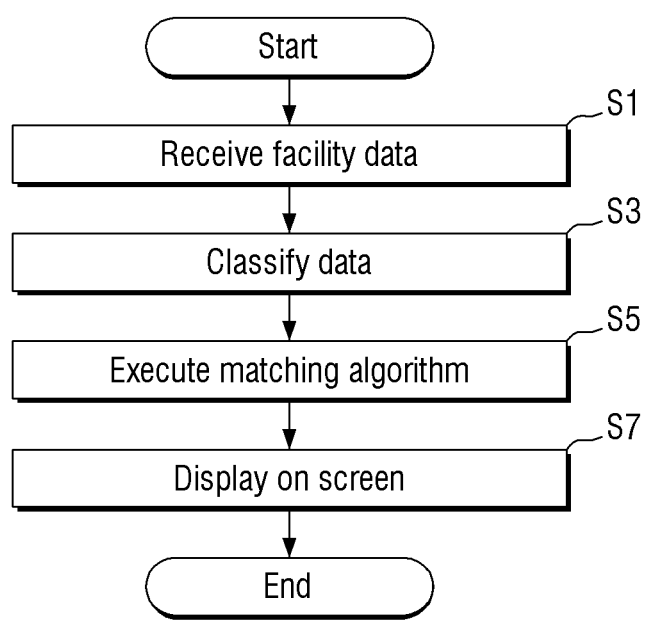
FIG. 12 is a flow chart illustrating an exemplary embodiment of an operation process of the manufacturing process visualization apparatus.

FIG. 12 is a flow chart illustrating an exemplary embodiment of an operation process of the manufacturing process visualization apparatus 100.

As shown in FIG. 12, a manufacturing process visualization method may include receiving, by the manufacturing process visualization apparatus 100, apparatus data from each production apparatus of a manufacturing process line (S1).

The manufacturing process visualization apparatus 100 may preliminarily classify the apparatus data received in S1 step into available data and unavailable data (S3).

The manufacturing process visualization apparatus 100 may then extract product record information about each product from the apparatus data falling under the preliminarily classified pool in step S3, classify the extracted product record information to information corresponding to the specific product flow properties of the manufacturing process line, and generate product flow information indicating the specific product flow properties by using the result of a collection of the classified product record information (S5).

The manufacturing process visualization apparatus 100 may then generate graphic process information about the manufacturing process line in which the product flow information generated through step S5 is graphically represented, and display thus-generated graphic process information on a screen (S7).

Figure 13:
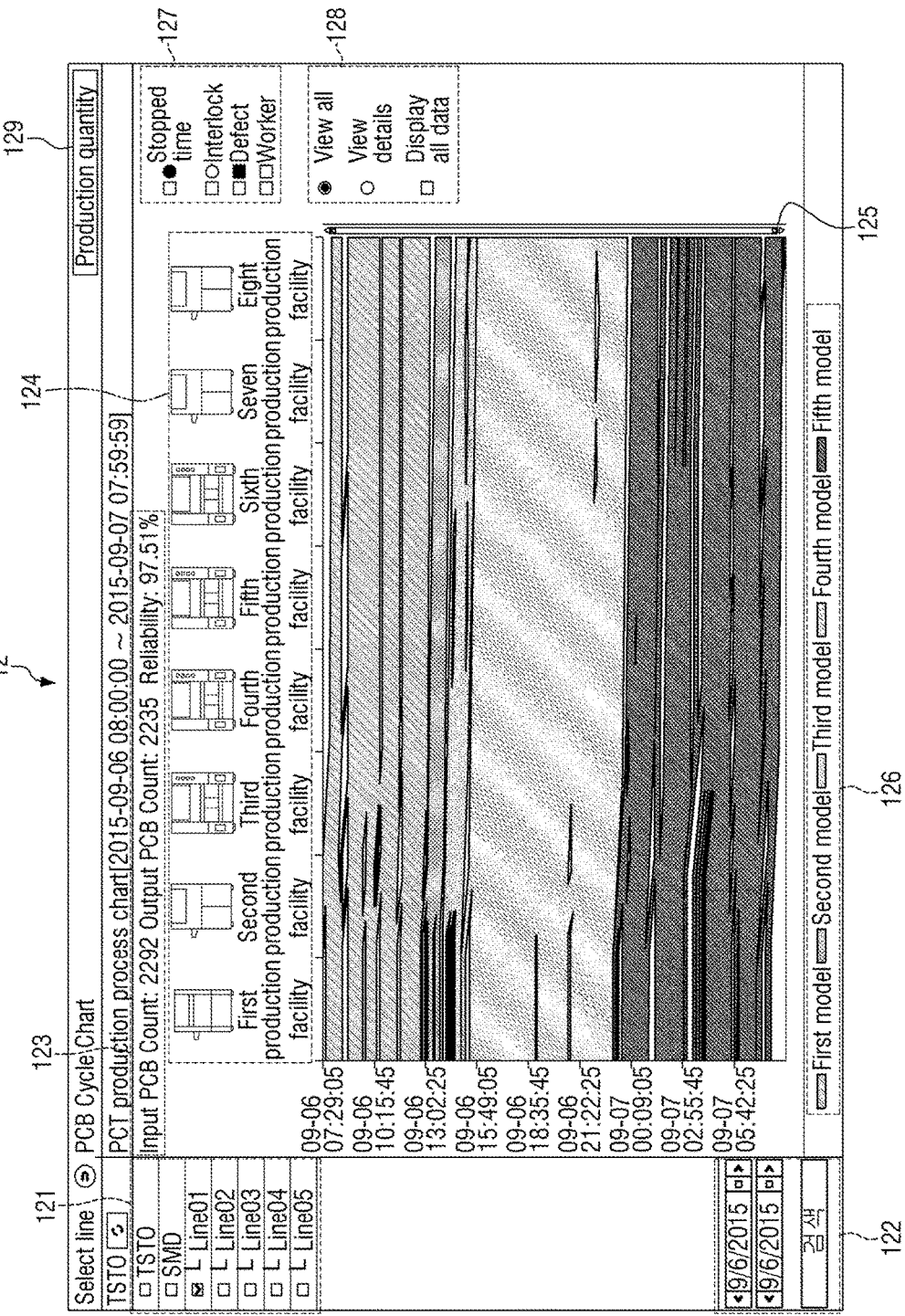
FIG. 13 illustrates still another exemplary embodiment of an output screen configuration.

FIG. 13 illustrates still another exemplary embodiment of an output screen configuration.

Products in respective production apparatuses are matched through the above-described process to generate product flow information. As shown in FIG. 13, an output screen may display various pieces of information including the product flow information. A search line setup box 121 may include manufacturing process lines. When a user such as a worker selects a manufacturing process line to be checked in the search line setup box 121, content regarding the selected manufacturing process line is displayed on the output screen.

There may be more than one manufacturing process line operating in a whole factory. Especially, more than one manufacturing process line operates if the factory produces more than one product. However, since each manufacturing process line performs a separate process, a worker may desire to check content on a certain specific process manufacturing line. In this case, a plurality of manufacturing process lines need to be separated.

A search period setup box 122 may allow a user to input a desired period to be checked. As shown in FIG. 13, the search period setup box 122 may have two columns in which dates are to be entered, wherein a first column is for a start time and a second column is for an end time. A worker may directly enter dates respectively in the first and second columns, or may select dates through a small calendar which is displayed when a specific icon is selected. Alternatively, the worker may select, from the beginning, a period of one week, two weeks, one month and so on from a recent time point. However, the inventive concept is not limited thereto, and various methods can be adopted as long as a period can be entered into the search period setup box 122.

When a specific manufacturing process line is selected in the search line setup box 121 and a specific period is entered in the search period setup box 122, pieces of process information of the selected manufacturing process line in the corresponding period are output on a screen.

A process production information box 123 may display a quantity of introduced products and a quantity of discharged products corresponding to the selected specific manufacturing process line, and data reliability within the specific period entered.

For example, if the specific manufacturing process line is a surface mount technology (SMT) process line, the quantity of introduced products may mean the quantity of PCBs having no component mounted thereon, and the quantity of discharged products may mean the quantity of finished PCBs having components all mounted thereon, among the introduced PCBs. Although the manufacturing process line is hereinafter described as being an SMT process line, the inventive concept is not limited thereto, and various other manufacturing process lines for producing products can be applied.

The quantity of introduced products and the quantity of discharged products may be different from each other. This is because various situations may occur during a process of manufacturing products, such as an occurrence of defects, a partial omission during a flow along a line, an occurrence of error in a part of an apparatus in a manufacturing process line, and the like. Therefore, reliability may be applied to determine the production efficiency of the manufacturing process line. The reliability can be calculated as follows.

Reliability=calculated number of PCBs/maximum number of PCBs×100(%)                                           <Mathematical equation 1>

In the above equation, the calculated number of PCBs can simply be a number of produced PCBs, preferably but not necessarily, the calculated number of PCBs is the number of PCBs in which all of the introduced PCBs and the discharged PCBs are matched. As described above, the matching unit 120 may match the same product or the product predicted as being the same among innumerable products passing through each production apparatus. The number of PCBs in which all of the introduced PCBs and the discharged PCBs are matched is determined as the calculated number of PCBs.

The maximum number of PCBs means the number of matchings between the introduced PCBs and the discharged PCBs under an assumption that there exist no defects, omission or the like. If there exist no defects, omission or the like, the number of the introduced PCBs would be the same as the number of the discharged PCBs. Therefore, the maximum number of PCBs may be the number of the introduced PCBs.

Examples of utilizing the reliability will be described in detail later.

An apparatus type box 124 shows apparatuses operating in a relevant manufacturing process line, and preferably but not necessarily, the apparatuses are arranged in a work sequence. The apparatus type box 124 may show only names of corresponding apparatuses, however, may show images together with types of the apparatuses as shown in FIG. 13.

A flow line chart 125, shown in FIG. 4, is a graphical representation showing a process in which an introduced PCB passes through a corresponding manufacturing line so as to be produced as a finished PCB as described above, wherein one PCB is represented in one line. A time consumed throughout the process and a time consumed in each of the apparatuses can be checked through time C during which the product stays in the first production apparatus. Preferably but not necessarily, the PCB of the same model type may have the same color, and the PCBs of different model types may have different colors.

A production model box 126 may show which color indicates which model type in the flow line chart 125 if the PCBs are of different model types.

A chart option box 127, a detailed chart view box 128, and a production quantity button 129 will be described in detail later.

Figure 14:
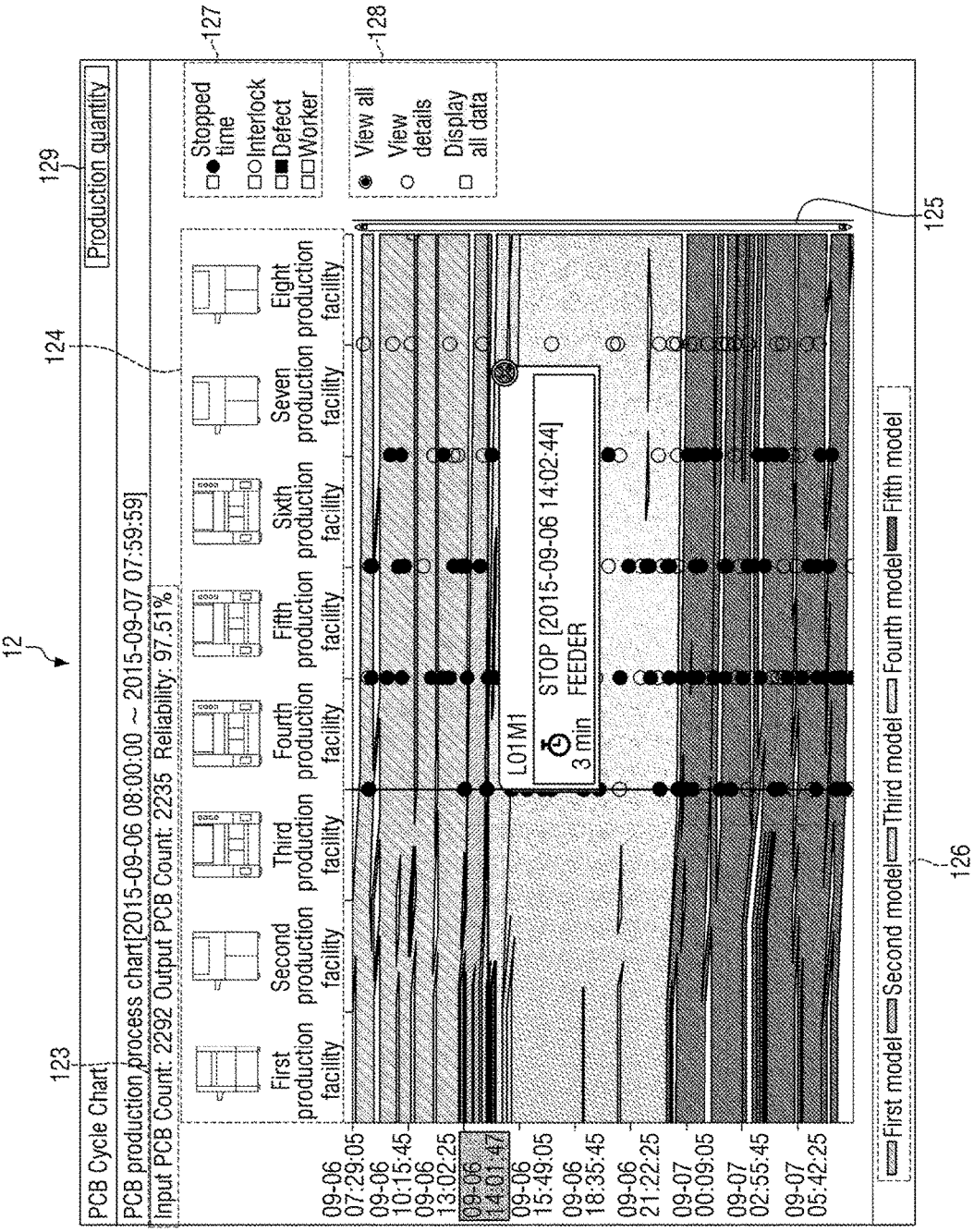
FIG. 14 is a schematic view illustrating a chart option box in which "stopped time" and "interlock" are ticked as displayed in the manufacturing process visualization apparatus, according to an exemplary embodiment.

FIG. 14 is a schematic view illustrating a chart option box in which "stopped time" and "defect" are selected as displayed in the manufacturing process visualization apparatus, according to an exemplary embodiment.

The chart option box 127 enables a user to select "stopped time", "interlock", "defects", "worker" and the like. When these are selected, the flow chart line 125 may show detailed marks.

When "stopped time" item is checked in the chart option box 127, the time when a corresponding manufacturing process has stopped is displayed in a black circular shape in the flow chart box 125 as shown in FIG. 14. The stopped time occurs when a part of a production apparatus among a plurality of production apparatuses of the corresponding manufacturing process line has an error, or defects occur in a product being manufactured during a production process.

As shown in FIG. 14, a plurality of stopped times may be displayed. The stopped times are displayed along a line shown in a vertical direction relatively to a plurality of specific points regularly spaced along a horizontal axis. The plurality of specific points are disposed among a plurality of production apparatuses of a corresponding manufacturing process line. This is to display, when a stopped time occurs at a certain specific production apparatus, the stopped time at a specific point immediately next to the corresponding production apparatus so as to show a user which production apparatus has stopped.

When the user selects a certain stopped time among a plurality of stopped times displayed in the flow line chart 125, detailed information regarding the selected stopped time is displayed as shown in FIG. 14. The detailed information may include, for example, an accurate date and time when the stopped time has occurred and a reason of the occurrence of the stopped time.

When the "interlock" is selected in the chart option box 127, a time when interlock has occurred in a corresponding manufacturing process line is displayed in a white circular shape in the flow chart box 125 as shown in FIG. 14. The occurrence of interlock may, for instance, be caused when a prerequisite work to be performed prior to starting a corresponding manufacturing process line is not done.

A representative prerequisite work may include screen printer ID scan, first in first out (FIFO) of solder paste, stencil management, temperature in each zone and the like. When the prerequisite work is not performed, an interlock system operates in each production apparatus to stop the production apparatus to prevent a failure of a manufacturing process line or a production of defective PCB.

As shown in FIG. 14, a plurality of interlocks may occur. Similarly to the stopped time, the interlock times may be displayed along a line shown in a vertical direction relatively to a plurality of specific points regularly spaced along a horizontal axis.

When a user selects a certain interlock time among a plurality of interlock times displayed in the flow line chart 125, detailed information regarding the selected interlock time is displayed as shown in FIG. 14. The detailed information may include, for example, an accurate date and time when the interlock has occurred and a reason of the occurrence of the interlock time.

Figure 15:
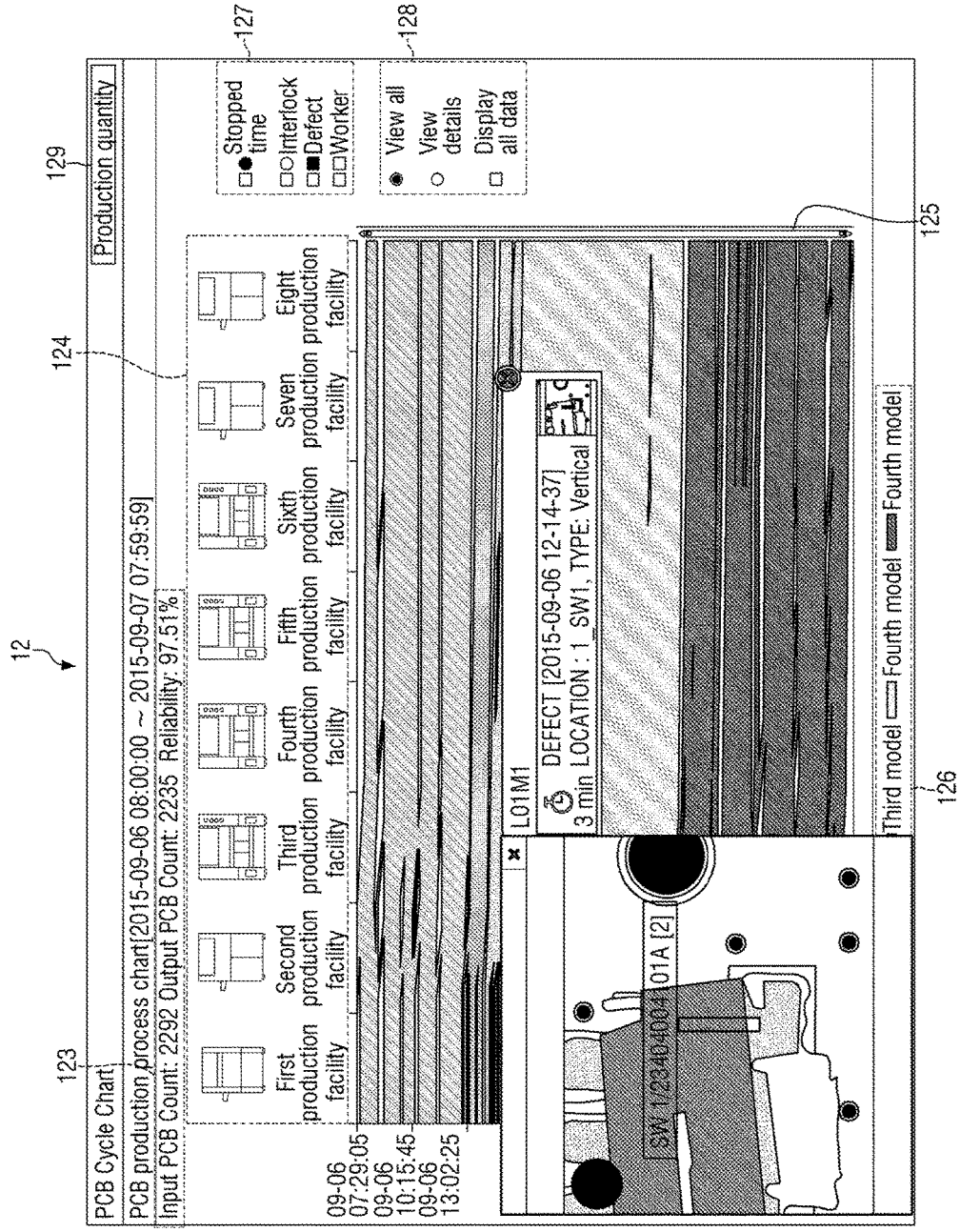
FIG. 15 is a schematic view illustrating a chart option box in which "defect" is ticked as displayed in the manufacturing process visualization apparatus, according to an exemplary embodiment.

FIG. 15 is a schematic view illustrating a chart option box in which the "defect" is selected as displayed in the manufacturing process visualization apparatus, according to an exemplary embodiment.

When the "defect" is ticked in the chart option box 127, a time when a defect occurs to a product in a corresponding manufacturing process line is displayed in a square shape in the flow chart box 125 as shown in FIG. 15. The occurrence of the defect may, for instance, be caused when a PCB is erroneously located, a product is erroneously placed, a mount head erroneously sucks a product, or an offset occurs during a movement of the mount head.

As shown in FIG. 15, a plurality of defect occurrence times may exist. Similarly to the stopped time, the defect occurrence times may be displayed along a line shown in a vertical direction relatively to a plurality of specific points regularly spaced along a horizontal axis.

When a user selects a certain defect occurrence time among a plurality of defect occurrence times displayed in the flow line chart 125, detailed information regarding the selected defect occurrence time is displayed as shown in FIG. 15. The detailed information may include, for example, an accurate date and time when the defect has occurred, a reason of the occurrence of the defect, an image of the defective product. Furthermore, when the image of the defective product is selected, the image can be enlarged-displayed. This enables a user to check the image of the defective product in more detail, helping in a cause analysis and in coming up with a solution.

As mentioned above, the selected stopped time may be displayed in a black circular shape, the selected interlock may be displayed in a white circular shape, and the selected defect may be displayed in a square shape in the flow line chart 125. These items in the chart option box 127 may be displayed in various shapes and colors in the flow line chart 125.

Although not shown in the drawings, the "worker" can be selected in the chart option box 127. One factory may have a plurality of manufacturing process lines, and it is realistically impossible to manage the plurality of manufacturing process lines by one worker. Furthermore, workers may work by turns even when there is only one manufacturing process line running but over a long period of time. If the "worker" is selected in the chart option box 127, the worker who was in charge at a corresponding date and time in a corresponding manufacturing process line may be displayed. However, the inventive concept is not limited thereto, and the chart option box 127 may have various items existing therein.

Figure 16:
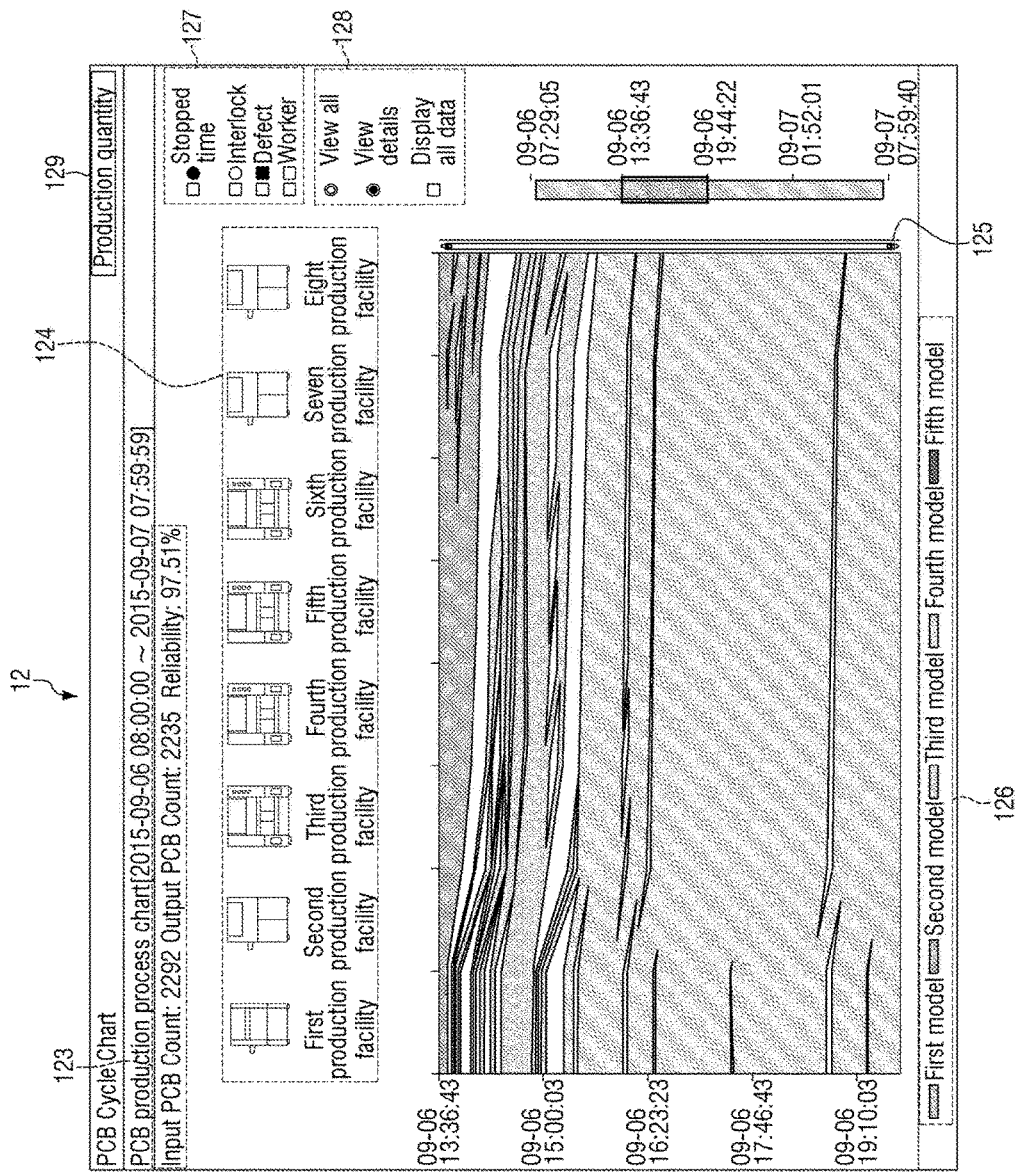
FIG. 16 is a schematic view illustrating a detailed chart view box in which "see details" is ticked as displayed in the manufacturing process visualization apparatus, according to an exemplary embodiment.

FIG. 16 is a schematic view illustrating a detailed chart view box in which the "see details" is selected as displayed in the manufacturing process visualization apparatus, according to an exemplary embodiment.

When the "see details" is selected, a time per spacing in a vertical axis in the flow line chart 125 may change as shown in FIG. 16. That is, the time per spacing may be shortened to enable a user to see the flow line chart 125 in more detail, thereby providing effects of enlarging the flow line chart 125.

As shown in FIG. 16, a scroll bar is formed at one side of the flow line chart 125. Since the time per spacing is shortened, all of works performed over a whole time in a corresponding manufacturing process line may not be displayed at the same time through a screen display 12. Thus, a section of time to which the flow line chart 125 currently being displayed in the screen display 12 belongs may be displayed by the scroll bar. The time of the flow chart line 125 currently being displayed may be changed by the scroll bar to check the flow line chart 125 at another time. Although not shown in FIG. 16, the time per spacing can be further changed. That is, the enlargement or reduction rate of the flow line chart 125 can be changed to enable a user to set the desired section of time.

A user may select the "display all data" in a detailed chart see box 128. The "display all data" will be described in detail later.

Figure 17:
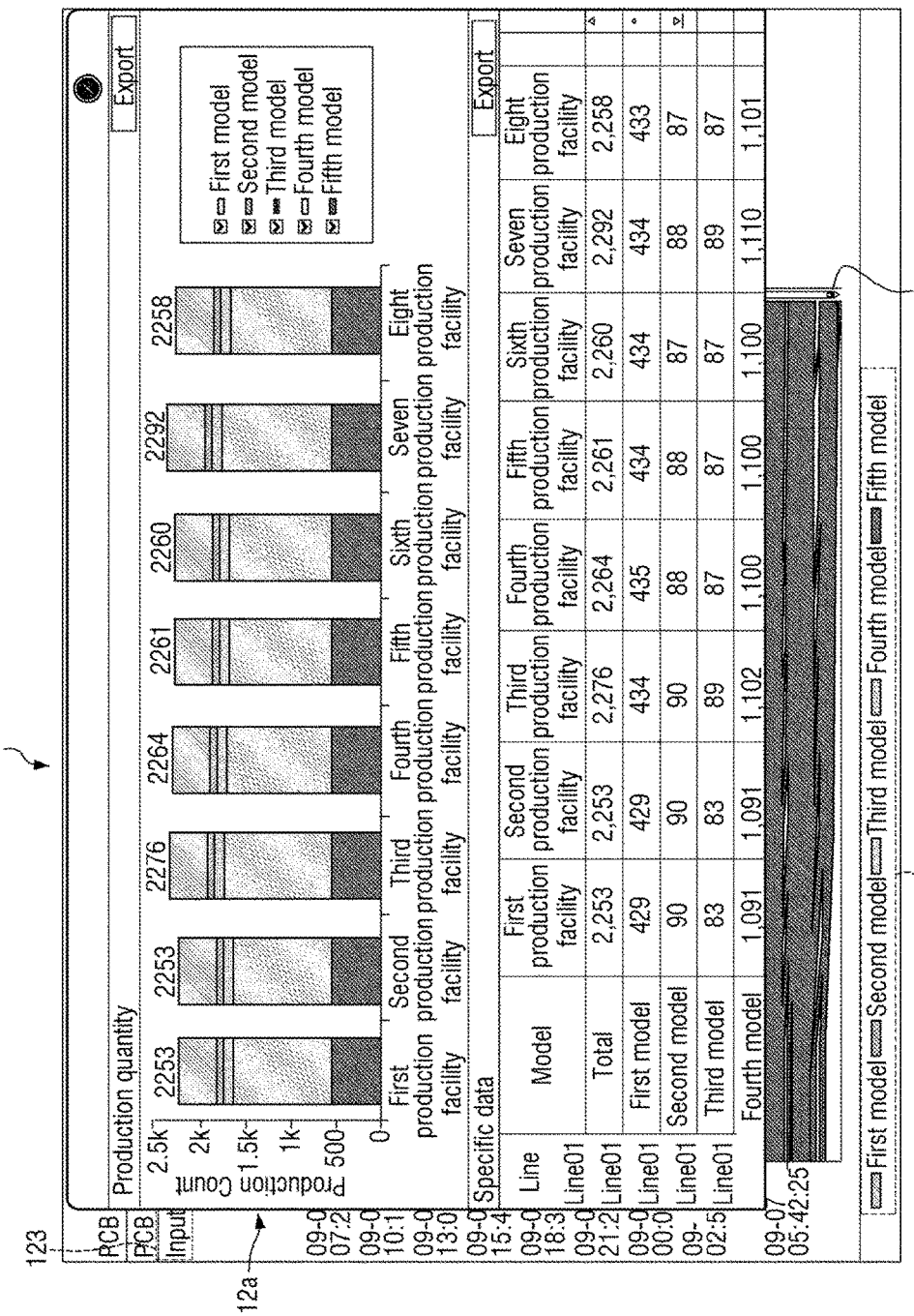
FIG. 17 is a schematic view illustrating when a production quantity button displayed in the manufacturing process visualization apparatus is selected, according to an exemplary embodiment.

FIG. 17 is a schematic view illustrating when a production quantity button displayed in the manufacturing process visualization apparatus is selected, according to an exemplary embodiment.

When a production quantity button 129 shown in FIG. 16 is selected, a production quantity may be displayed, as shown in FIG. 17, for each production apparatus of a corresponding manufacturing process line and for each model type of a product being produced. As shown in FIG. 17, a bar graph or a histogram may be displayed in which each production apparatus is on a horizontal axis and a production quantity is on a vertical axis. In this case, the model type of the product being produced can be discriminated by color. However, the inventive concept is not limited thereto, and various graphical representations such as a pie graph and a broken line graph can be used as long as such graphical representations enable users to easily understand a status relating to a production quantity.

A model selection box for selecting the model type of a product may be formed in one side of the graph as shown in FIG. 14. If the graph is a bar graph or a histogram in which each production apparatus is on a horizontal axis and a production quantity is on a vertical axis, the model type of the product being produced can be discriminated by color. To easily compare a part of the model types of the product being produced, the rest of the model types may be preferably excluded from the graph. Thus, a user may select and check only the desired model type of the product in the model selection box. However, if the type or format of the graph changes, the model selection box may also change to enable the user to select items other than the model type of the product.

When the production quantity button 129 is selected, a new window opens in the screen display unit 12, as shown in FIG. 14, which may slight hide the existing content. However, the present disclosure is not limited thereto, and the status of the production quantity may be displayed in various other methods.

As shown in FIG. 14, detailed data of the production quantity is shown beneath the graph. The detailed data may be shown by a table in which each production apparatus is on a horizontal axis and a model type of a product being produced is on a vertical axis. However, the inventive concept is not limited thereto, and the detailed data may be shown in various other methods. In addition, preferably but not necessarily, the graph and the table of the data can be downloaded.

Figure 18:
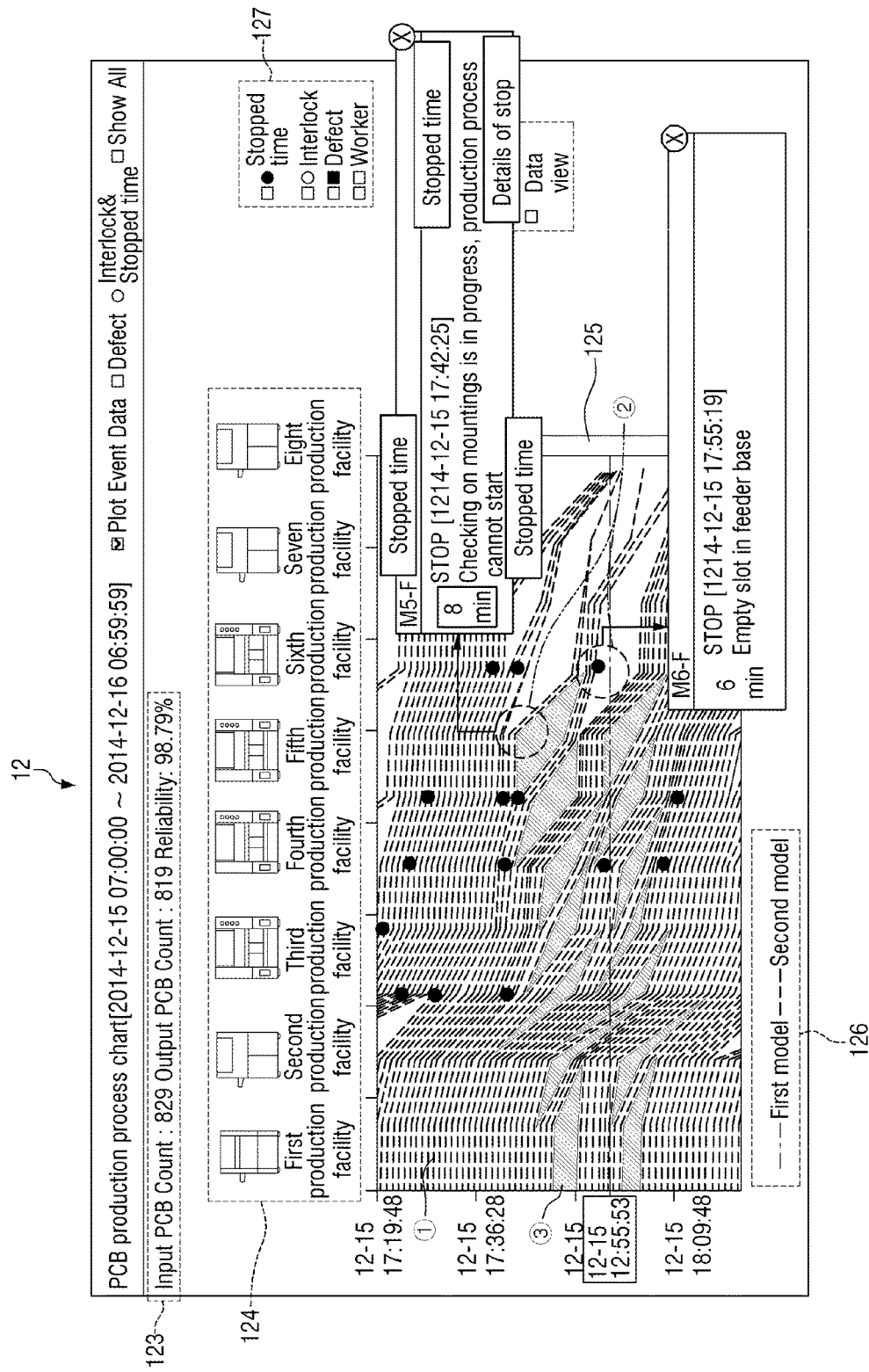
FIG. 18 is a schematic view for analyzing a flow line chart, according to an exemplary embodiment.

FIG. 18 is a schematic view for analyzing the flow line chart, according to an exemplary embodiment.

A method of analyzing the flow line chart 125 will hereinafter be described so that a user may understand a product manufacturing status of a corresponding manufacturing process line by referring to the flow line chart 125.

The flow line chart 125 according to the exemplary embodiment may include, as shown in FIG. 18, first graphic information ① indicating a product production pattern, second graphic information ② indicating a point at which a trouble in product production occurs, and third graphic information ③ indicating a period during which product production stops.

The first graphic information ① may support intuitive understanding on LOB, and allows for easy understanding on a production pattern of a manufacturing process line. As described with reference to FIG. 2 above, the flow line chart 125 may include an axis along which pieces of information specifying at least one production apparatus of the manufacturing process line are sequentially arranged, and a time axis indicating the time during which the process is performed. The screen display 12 may display, on the flow line chart 125, time A when a product is introduced into a corresponding production apparatus, time B when the product is discharged from the corresponding production apparatus, and time C which is a difference between the introduced time A and the discharged time B, and a graph slope D of each apparatus. The axes specifying the production apparatuses may maintain predetermined spacing therebetween. Thus, the slope may change depending on the time displayed on the time axis, and the user may analyze the flow line chart 125 through the time axis.

The difference C between the introduced time A and the discharged time B may indicate the time during which the product stays in the corresponding production apparatus. Therefore, if the difference C between the introduced time A and the discharged time B is long, it may mean that the product has stayed long in the corresponding production apparatus, and if the difference C between the introduced time A and the discharged time B is short, it may mean that the product has not stayed long in the corresponding production apparatus. Furthermore, if the difference C between the introduced time A and the discharged time B is long, it may mean that the slope D is steep, and if the difference C between the introduced time A and the discharged time B is short, it may mean that the slope D is gentle.

The second graphic information ② may include information on a reason for the trouble in the product production and information on details of the trouble in the product production. The second graphic information ② may be generated when a corresponding production apparatus having a gentle slope D has suddenly been changed to a steep slope D.

If the slope D is extraordinarily steep, the product has stayed too long in a corresponding production apparatus, which means that work speed of the corresponding production apparatus becomes remarkably long. This may indicate an occurrence of stoppage, interlock or defective product in the corresponding production apparatus. When a user selects the second graphic information ② through the screen display 12, a reason for the trouble in product production, an occurrence time of the trouble, the production apparatus in which the trouble has occurred, and the like may be displayed. This may enable the user to immediately come up with a solution. This may also prevent productivity loss and economical loss, and save time and manpower in solving problems.

The third graphic information ③ shows a case where the slope D is flat. If the slope D is extraordinarily gentle, it may mean that the product has passed through the corresponding production apparatus too fast, and if the slope E is nearly flat as in the third graphic information ③, it may mean that the product has passed through the corresponding production apparatus without being processed. Thus, the user should be able to check whether the corresponding production apparatus has stopped working or has worked correctly.

Figure 19:
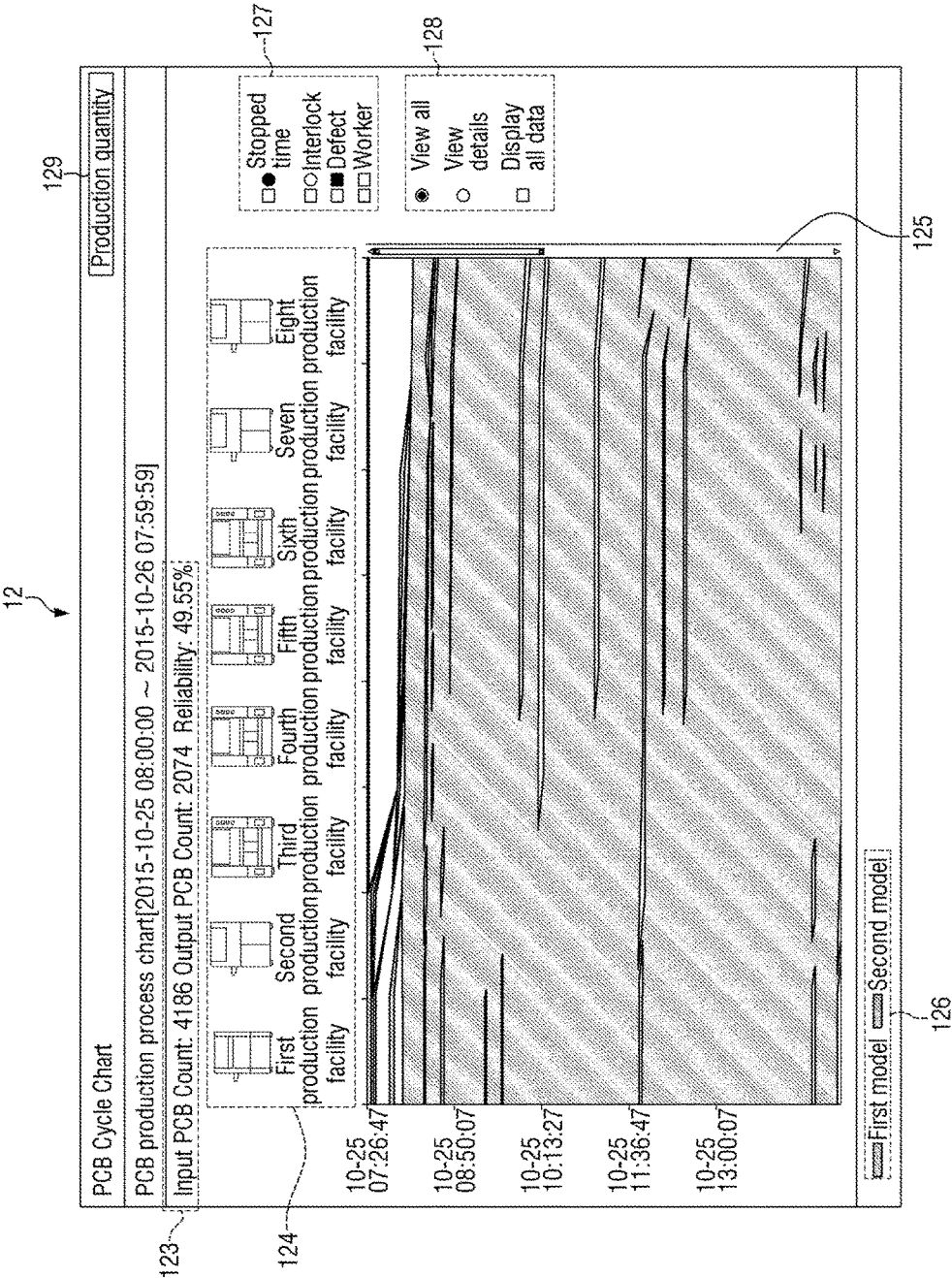
FIG. 19 and FIG. 20 are schematic views illustrating examples of reliability utilization according to exemplary embodiments.
Figure 20:
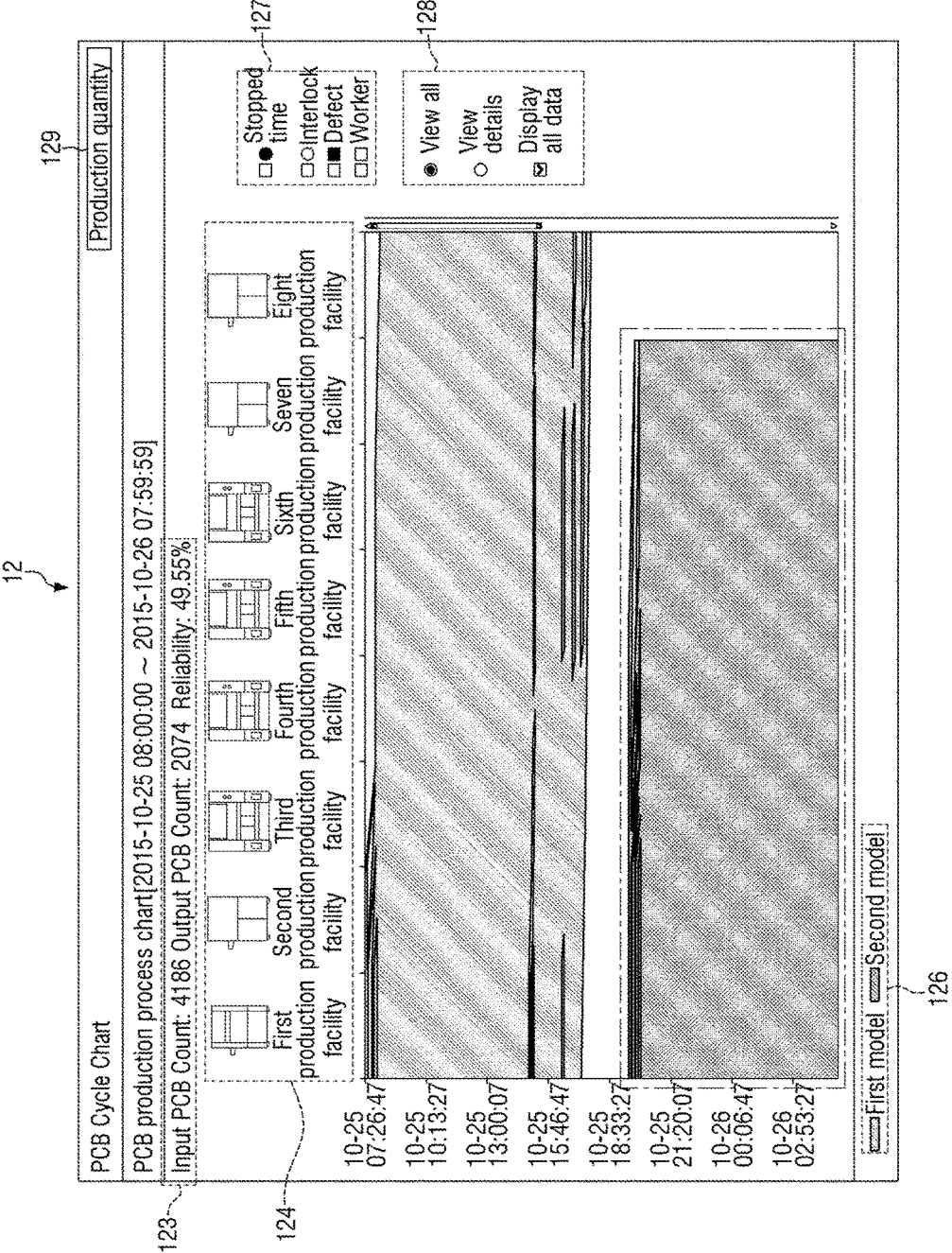

FIG. 19 and FIG. 20 are schematic views illustrating examples of reliability utilization according to exemplary embodiments.

As described above, since the quantity of the introduced products and the quantity of the discharged products may be different from each other, reliability may be calculated to determine production efficiency of a manufacturing process line. The reliability 49.55% as shown in FIG. 19 may be rather low, but no abnormality is shown in the flow line chart 125. The line of the flow line chart 125 may be formed only when the introduced product is discharged as a finished product. Since the introduced product which becomes defective or omitted is not reflected to the flow line chart 125, no abnormality is shown in the flow line chart 125 even when the reliability is low. In this case, the user should be able to check the status of the product which becomes defective or omitted.

As shown in FIG. 20, when the "display all data" is selected in the detailed chart see box 128, a status of a product which becomes defective or omitted is all displayed in the screen display 12. Each line displayed through the flow line chart 125 shows a flow of an introduced product until the introduced product is discharged as a finished product. Therefore, one line corresponds to one product. However, as described above, not all of the introduced products are finished since there might be defects, error and the like. When the "display all data" is selected, all of the products which have been introduced but not finished and thus not shown as lines in the flow line chart 125 can be shown in respective lines. However, these incomplete products may be shown in broken lines in the flow line chart 125. As shown in FIG. 20, the flow line chart 125 may have different types of lines in upper and lower parts thereof, which means that model types of products being produced may be different. The lines shown in the upper part are all connected from a left end to a right end of the flow line chart 125, but the lines shown in the lower part are all disconnected and broken from the left end to the right end of the flow line chart 125. This means that the products corresponding to the lines shown in the lower part have become defective or omitted, and thus, become incomplete. The user may easily find a production apparatus in which broken lines frequently occur. Then, the user may check the production apparatus in which stoppage, defects or omission of product frequently occur to identify the reason for the low reliability.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 1 and 2 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

The inventive concept provides a manufacturing process visualization apparatus which enables users to easily understand the status of manufacturing process, and thus the manufacturing process visualization apparatus can be com-

What is claimed is:

1. A manufacturing process visualization apparatus comprising:
at least one processor configured to implement:
a data receiving unit which receives apparatus data from at least one production apparatus of a manufacturing process line processing a plurality of products; and
a matching unit which extracts, from the received apparatus data, an introduction time of a product introduced in a production apparatus among the at least one production apparatus, and a discharge time of the product discharged from the production apparatus, and generates a graph having a start point indicating the introduction time, an end point indicating the discharge time, and a slope indicating a processing speed of the production apparatus; and
a screen display which displays the generated graphic on a screen,
wherein the matching unit determines, based on the received apparatus data, at least one of an inter-production apparatus flow time, an inter-production apparatus time difference information, whether the inter-production apparatus time difference information has a negative number, whether the inter-production apparatus time difference information falls within an error range which is preset with respect to an average of the inter-production apparatus time difference information, a result of comparing a number of product flow lines and a number of total production apparatuses, and whether a product model type applied to the manufacturing process line is changed, and
wherein the screen display displays a flow line chart in which flow information about the products is shown in the graph, and a process production information box comprising data reliability, the reliability indicating, as a result of collection of product flow information about a plurality of production apparatuses including the at least one production apparatus, a ratio between a maximum number of products to be processed and a number of products for which the product flow information are matched from introduction into the manufacturing process line to discharge from the manufacturing process line.

2. The manufacturing process visualization apparatus of claim 1, wherein the matching unit extracts, from the received apparatus data, model type information of the product.

3. The manufacturing process visualization apparatus of claim 1, wherein the matching unit further determines whether to bypass a production apparatus of the plurality of production apparatus.

4. The manufacturing process visualization apparatus of claim 3, wherein the matching unit determines product model types of the products processed at each of the at least one production apparatus, classifies the production apparatus as a standard apparatus or a bypass apparatus according to a number of product model types processed at the production apparatus, and determines a product model type of which processing is to be bypassed at the bypass apparatus.

5. The manufacturing process visualization apparatus of claim 1, wherein the matching unit generates the graphic in a domain of a product apparatus axis and a time axis,
wherein pieces of information specifying the at least one production apparatus of the manufacturing process line are sequentially arranged in the product apparatus axis, and
wherein the time axis indicates a passage of time in the manufacturing process line.

6. The manufacturing process visualization apparatus of claim 1, wherein the screen display further displays a chart option box for selectively displaying a time when at least one of the plurality of production apparatuses has stopped, a time when an interlock has occurred, and a time when a defect has occurred to a certain product.

7. The manufacturing process visualization apparatus of claim 6, wherein, when the time when at least one of the plurality of production apparatuses has stopped is selected in the chart option box, a date, time or a reason for the stoppage is displayed in the flow line chart.

8. The manufacturing process visualization apparatus of claim 6, wherein, when the time when the interlock has occurred is selected in the chart option box, a date, time or a reason for the interlock is displayed in the flow line chart.

9. The manufacturing process visualization apparatus of claim 6, wherein, when the time when the defect has occurred to the certain product flowing in the plurality of production apparatuses is selected in the chart option box, a date, time or a reason for the defect in the flow line chart, and an image of the certain product is displayed together.

10. The manufacturing process visualization apparatus of claim 9, wherein, when the image of the certain product is selected, the image is enlarged and displayed in the screen display.

11. The manufacturing process visualization apparatus of claim 9, wherein, when a worker who is in charge of the plurality of production apparatuses is selected in the chart option box, a worker who is in charge of the manufacturing process line at a certain date and a certain time is displayed.

12. The manufacturing process visualization apparatus of claim 1, wherein the screen display further displays a detailed chart view box capable of enlarging the flow line chart.

13. The manufacturing process visualization apparatus of claim 12, wherein, when all data is selected to be displayed in the detailed chart view box, the product flow information regarding products which have been introduced into the manufacturing process line but have not been discharged are displayed in the graph in the flow line chart.

14. The manufacturing process visualization apparatus of claim 12, wherein the screen display further displays a production quantity button for representing, in the graph, a production quantity for each of the production apparatuses of the manufacturing process line and for each model type of the products being processed.

15. A manufacturing process visualization method of at least one processor, the manufacturing process visualization method comprising:
receiving apparatus data from at least one production apparatus of a manufacturing process line processing a plurality of products;
extracting, from the received apparatus data, an introduction time of a product of the plurality of products which is introduced in a production apparatus among the at least one production apparatus, and a discharge time of the product discharged from the production apparatus;
generating a graph having a start point indicating the introduction time, an end point indicating the discharge time, and a slope indicating a processing speed of the production apparatus; and controlling to display the generated graphic on a screen,
wherein the classifying comprises determining, based on the received apparatus data, at least one of an inter-production apparatus flow time, an inter-production apparatus time difference information, whether the inter-production apparatus time difference information has a negative number, whether the inter-production apparatus time difference information falls within an error range which is preset with respect to an average of the inter-production apparatus time difference information, information obtained by comparing a number of product flow lines based on product flow information and a number of total production apparatuses, and whether a product model type applied to the manufacturing process line is changed, wherein the manufacturing process visualization method further comprises displaying a flow line chart in which flow information about the products is shown in the graph, and a process production information box comprising data reliability, the reliability indicating, as a result of collection of the product flow information about a plurality of production apparatuses including the at least one production apparatus, a ratio between a maximum number of products to be processed and a number of products for which the product flow information are matched from introduction into the manufacturing process line to discharge from the manufacturing process line.

16. The manufacturing process visualization method of claim 15, wherein the extracting comprises extracting model type information of the product from the received apparatus data.

17. The manufacturing process visualization method of claim 15, wherein the manufacturing process visualization method further comprises determining whether to bypass the production apparatus.

* * * * *